United States Patent
Shimura

(10) Patent No.: US 7,347,088 B2
(45) Date of Patent: Mar. 25, 2008

(54) INSTALLATION STRUCTURE OF ELECTRONIC COMPONENT FOR TIRE

(75) Inventor: Kazuhiro Shimura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 281 days.

(21) Appl. No.: 10/542,231

(22) PCT Filed: Jan. 28, 2004

(86) PCT No.: PCT/JP2004/000761

§ 371 (c)(1),
(2), (4) Date: Jul. 15, 2005

(87) PCT Pub. No.: WO2004/074017

PCT Pub. Date: Sep. 2, 2004

(65) Prior Publication Data

US 2006/0059982 A1    Mar. 23, 2006

(30) Foreign Application Priority Data

Feb. 24, 2003 (JP) .............................. 2003-046282

(51) Int. Cl.
*G01M 17/02* (2006.01)
(52) U.S. Cl. ...................................................... 73/146
(58) Field of Classification Search ............ 73/146, 73/146.2, 146.3, 146.4, 146.5, 146.8
See application file for complete search history.

(56) References Cited

U.S. PATENT DOCUMENTS

| | | | | |
|---|---|---|---|---|
| 4,356,726 A | * | 11/1982 | Yoshino | .................. 73/178 R |
| 6,175,301 B1 | | 1/2001 | Piesinger | |
| 6,217,683 B1 | | 4/2001 | Balzer et al. | |
| 7,004,019 B2 | * | 2/2006 | Fischer et al. | ................ 73/146 |
| 2003/0074961 A1 | * | 4/2003 | Fischer et al. | ................ 73/146 |

FOREIGN PATENT DOCUMENTS

| | | |
|---|---|---|
| JP | 04-146806 A | 5/1992 |
| JP | 09-136517 A | 5/1997 |
| JP | 10-315720 A | 12/1998 |
| JP | 11-278021 A | 10/1999 |
| JP | 11-342712 A | 12/1999 |
| JP | 2000-168322 A | 6/2000 |
| JP | 2002-502765 A | 1/2002 |
| JP | 2002-103931 A | 4/2002 |
| JP | 2002-211222 A | 7/2002 |
| JP | 2002-541003 A | 12/2002 |
| WO | WO01/25034 A1 | 4/2001 |

OTHER PUBLICATIONS

PCT International Search Report for PCT/JP2004/000761 mailed on May 25, 2004.

* cited by examiner

*Primary Examiner*—Andre J. Allen
(74) *Attorney, Agent, or Firm*—Greer, Burns & Crain, Ltd.

(57) ABSTRACT

An installation structure of an electronic component for a tire, where the installation structure protects the electronic component from heat produced by a tire and a braking device and enables accurate information about the inside of the tire to be obtained without being affected by the heat sources. In the installation structure, an electronic component housed in a case is installed at an arbitrary installation in the air chamber of a tire and a heat-insulating structure is interposed between the electronic components and the installation position.

5 Claims, 4 Drawing Sheets

US 7,347,088 B2

INSTALLATION STRUCTURE OF ELECTRONIC COMPONENT FOR TIRE

TECHNICAL FIELD

The present invention relates to a structure where an electronic component for detecting information about the inside of a tire, such as an internal pressure and a temperature, is installed at an arbitrary installation position in an air chamber of the tire. More particularly, the present invention relates to an installation structure of an electronic component for a tire, where the installation structure protects the electronic component from heat produced by the tire and a braking device and enables accurate information about the inside of the tire to be obtained without being affected by the heat sources.

BACKGROUND ART

In order to monitor information about the inside of a tire, such as an internal pressure and a temperature, there has been heretofore performed installation of various electronic components in an air chamber of the tire. These electronic components are generally attached to an inner surface of the tire or an outer peripheral surface of a rim, or buried in the inside of the tire (for example, see Japanese patent application Kokai publication Nos. Hei 11(1999)-278021 and 2000-168322).

However, if an electronic component for detecting information about the inside of a tire is installed in a state where the electronic component adheres closely to the tire or a wheel, heat produced by the tire and a braking device is easily transmitted to the electronic component, and accordingly, it is difficult to use electronic components having a low heat resistance. Moreover, in detection of an air pressure, normally, a pressure sensor measures an internal pressure of the tire. Meanwhile, a temperature sensor measures a temperature in an air chamber of the tire, and the internal pressure of the tire is corrected based on the temperature. However, if the temperature sensor is affected by the heat produced by the tire and the braking device, there is not only a problem that an accurate temperature cannot be obtained but also a problem that the internal pressure of the tire, which is corrected based on the temperature, also becomes inaccurate.

SUMMARY OF THE INVENTION

It is an object of the present invention to provide an installation structure of an electronic component for a tire, where the installation structure protects the electronic component from heat produced by the tire and a braking device and enables accurate information about the inside of the tire to be obtained without being affected by the heat sources.

An installation structure of an electronic component for a tire of the present invention to achieve the foregoing object is a structure where an electronic component housed in a case is installed at an arbitrary installation position in an air chamber of the tire, characterized in that a heat-insulating structure is interposed between the electronic component and the installation position.

Specifically, the installation structure of an electronic component for a tire of the present invention is a structure where an electronic component housed in a case is installed at an arbitrary installation position in an air chamber of the tire, characterized in that a heat-insulating structure is interposed between the case and the installation position.

More specifically, the installation structure of an electronic component for a tire of the present invention is a structure where an electronic component housed in a case is installed at an arbitrary installation position in an air chamber of the tire, characterized in that a pedestal including a base plate part which comes into contact with the installation position, and supporting parts which support the case is used; that the base plate part of the pedestal is attached to the installation position; that the case is fixed to the supporting parts of the pedestal; and that a heat-insulating structure is interposed between the case and the base plate part of the pedestal.

As described above, by interposing the heat-insulating structure between the electronic component installed in the air chamber of the tire and the installation position, the electronic component is protected from the heat produced by the tire and the braking device. At the same time, more accurate information about the inside of the tire can be obtained without being affected by the heat sources.

As the heat-insulating structure described above, a heat-insulating space or a heat-insulating material can be interposed. If the heat-insulating space is interposed, the heat-insulating space may be an open space or may be a closed space where a pressure is reduced approximately to a vacuum state. If the heat-insulating material is interposed, it is preferable that the heat-insulating material is formed of resin foam such as open-cell sponge and foamed plastic, organic fibers or inorganic fibers. Particularly, an organic high-temperature heat-insulating material using harmless organic fibers with high-temperature resistance, such as poly-paraphenylene benzobisoxazole (PBO), is preferable.

In the above-described installation structure of an electronic component for a tire, since the heat produced by the heat sources such as the tire and the braking device is easily transmitted to the pedestal which supports the case of the electronic component, it is preferable that the pedestal is formed of resin of which continuous duty is allowed at temperatures of no less than 80° C. When such a pedestal is used, it is preferable that a patch which can be bonded to the installation position of the electronic component is integrated with the pedestal. Moreover, it is preferable that through holes are provided in the patch at positions corresponding to the supporting parts of the pedestal and the pedestal is held by the patch while inserting the supporting parts into the through holes. According to the structure described above, an operation of installing the pedestal is facilitated.

In the present invention, an arbitrary installation position in the air chamber of the tire means any position in an inner surface of a pneumatic tire or an outer peripheral surface of a rim of a wheel, the position being suitable in installation of the electronic component. For example, an inner surface of a bead part of the pneumatic tire, an inner surface of a tread part of the pneumatic tire, an outer peripheral surface of a rim in a well part of the wheel, or the like is suitable. Further, an electronic component means a pressure sensor, a temperature sensor, a transmitter, a receiver, a control circuit, a battery or the like. These electronic components are usually housed in a case and unitized.

DESCRIPTION OF THE PREFERRED EMBODIMENTS

With reference to the accompanying drawings, a configuration of the present invention will be described in detail below.

Figure 1:
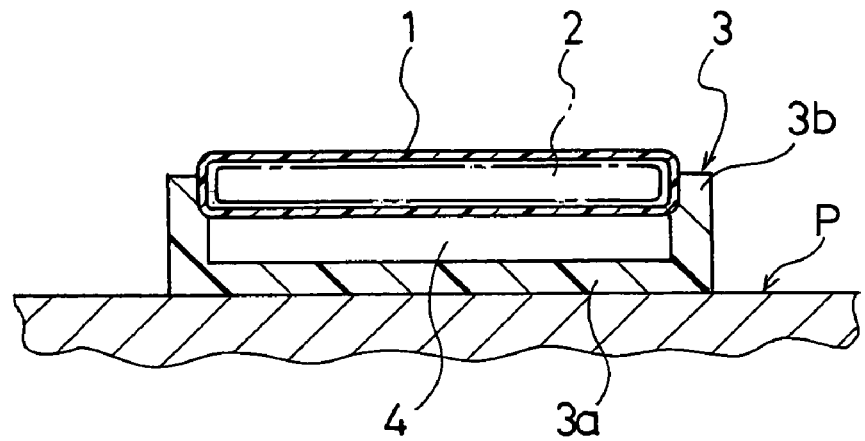
FIG. 1 is a sectional view schematically showing an example of an installation structure of an electronic component for a tire of the present invention.
Figure 2:
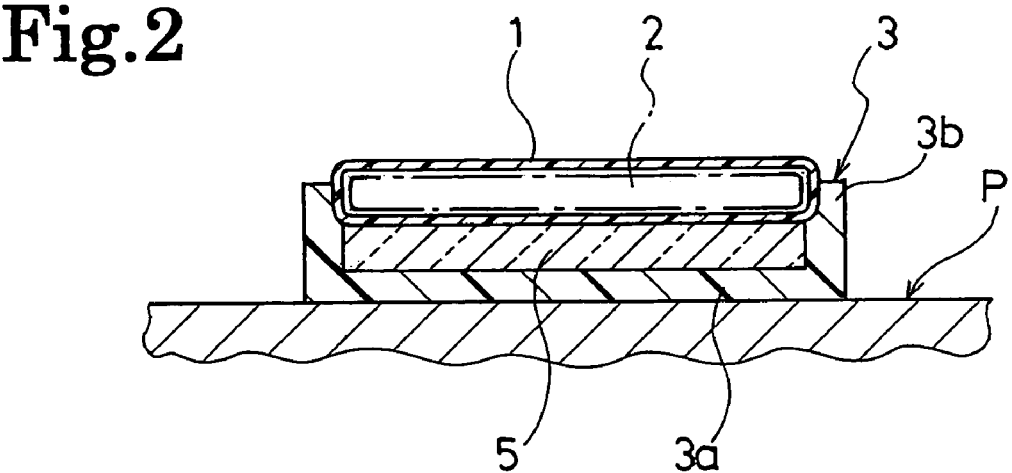
FIG. 2 is a sectional view schematically showing another example of the installation structure of an electronic component for a tire of the present invention.

FIGS. 1 and 2 both schematically show an installation structure of an electronic component for a tire of the present invention. As shown in FIGS. 1 and 2, the installation structure of an electronic component for a tire of the present invention is a structure where an electronic component 2 housed in a case 1 is installed at an arbitrary installation position P in an air chamber of the tire.

In FIG. 1, a pedestal 3, which includes a base plate part 3a coming into contact with the installation position P, and a supporting part 3b supporting the case 1, is used. The base plate part 3a of the pedestal 3 is mounted on the installation position P, and the case 1 is fixed to the supporting part 3b of the pedestal 3. Accordingly, a heat-insulating structure formed of a heat-insulating space 4 is interposed between the case 1 and the base plate part 3a of the pedestal 3. Meanwhile, in FIG. 2, a heat-insulating structure formed of a heat-insulating material 5 is interposed between the case 1 and the base plate part 3a of the pedestal 3. Specifically, there is formed a structure where the electronic component 2 easily affected by heat is spaced from the installation position P with the heat-insulating structure interposed therebetween.

Here, the heat-insulating structure formed of the heat-insulating space 4 or the heat-insulating material 5 may be provided in the case 1 as long as the heat-insulating structure is positioned between the electronic component 2 and the installation position P. Moreover, the pedestal 3 does not necessarily have to be used as long as the heat-insulating structure formed of the heat-insulating space 4 or the heat-insulating material 5 is structured so as to interpose the heat-insulating structure between the electronic component 2 and the installation position P.

Figure 3:
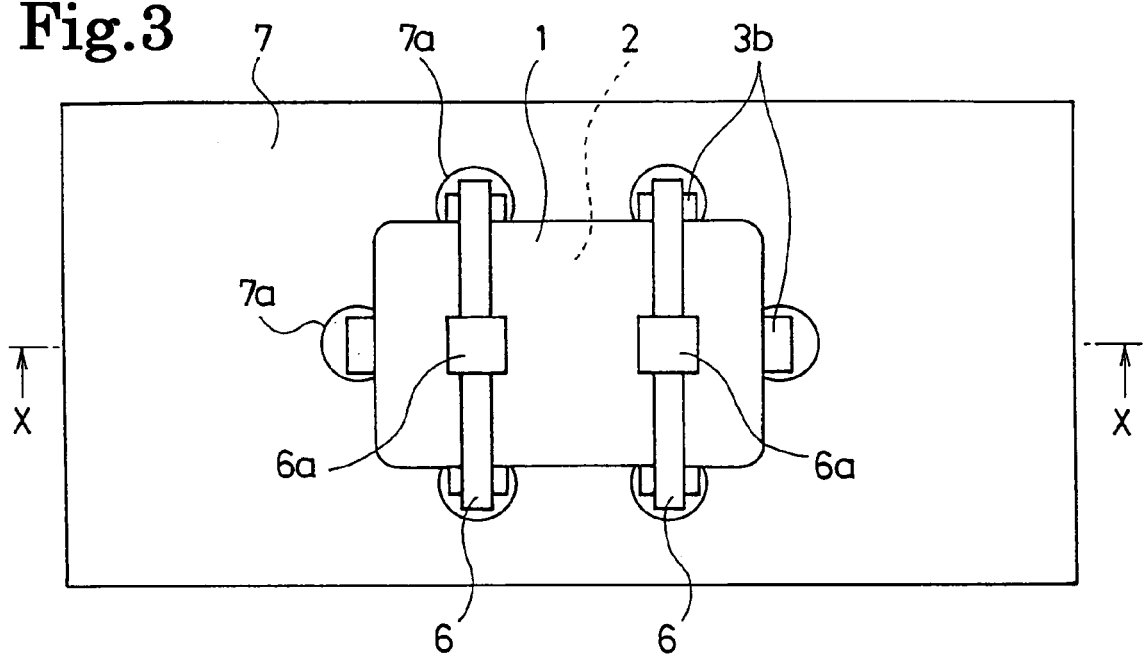
FIG. 3 is a plan view showing an installation structure of an electronic component for a tire according to a preferred embodiment of the present invention.
Figure 4:
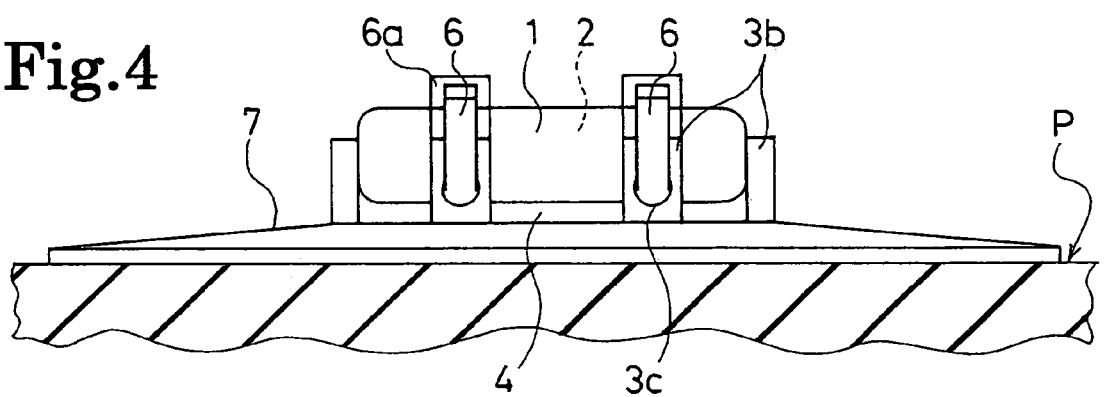
FIG. 4 is a side view showing the installation structure of an electronic component for a tire according to the preferred embodiment of the present invention.
Figure 5:
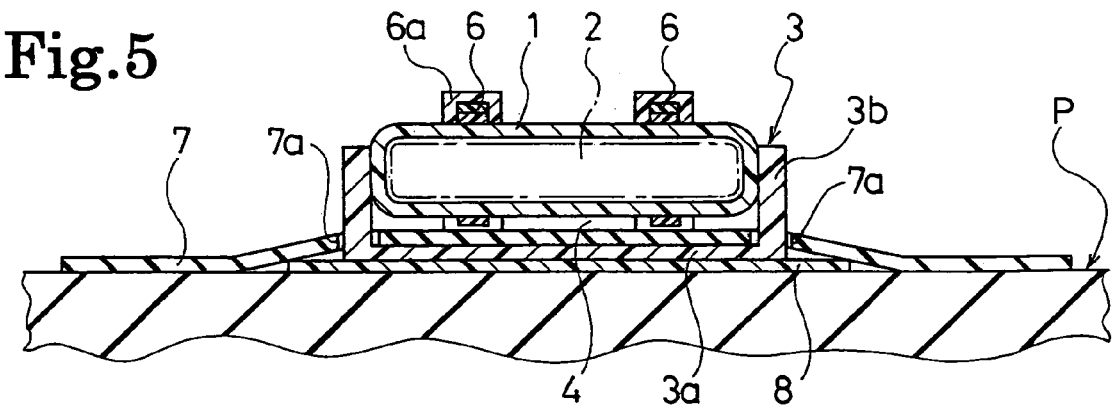
FIG. 5 is a sectional view along the line X-X indicated by the arrows in FIG. 3.
Figure 6:
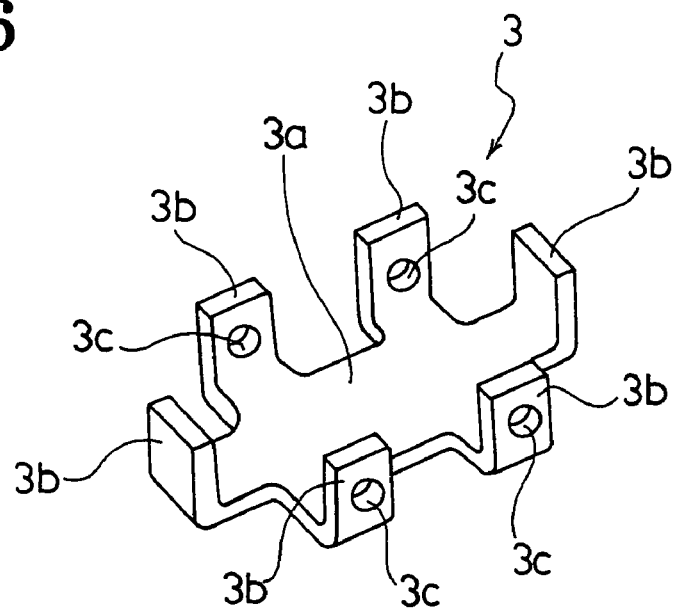
FIG. 6 is a perspective view showing a pedestal used in the present invention.
Figure 7:
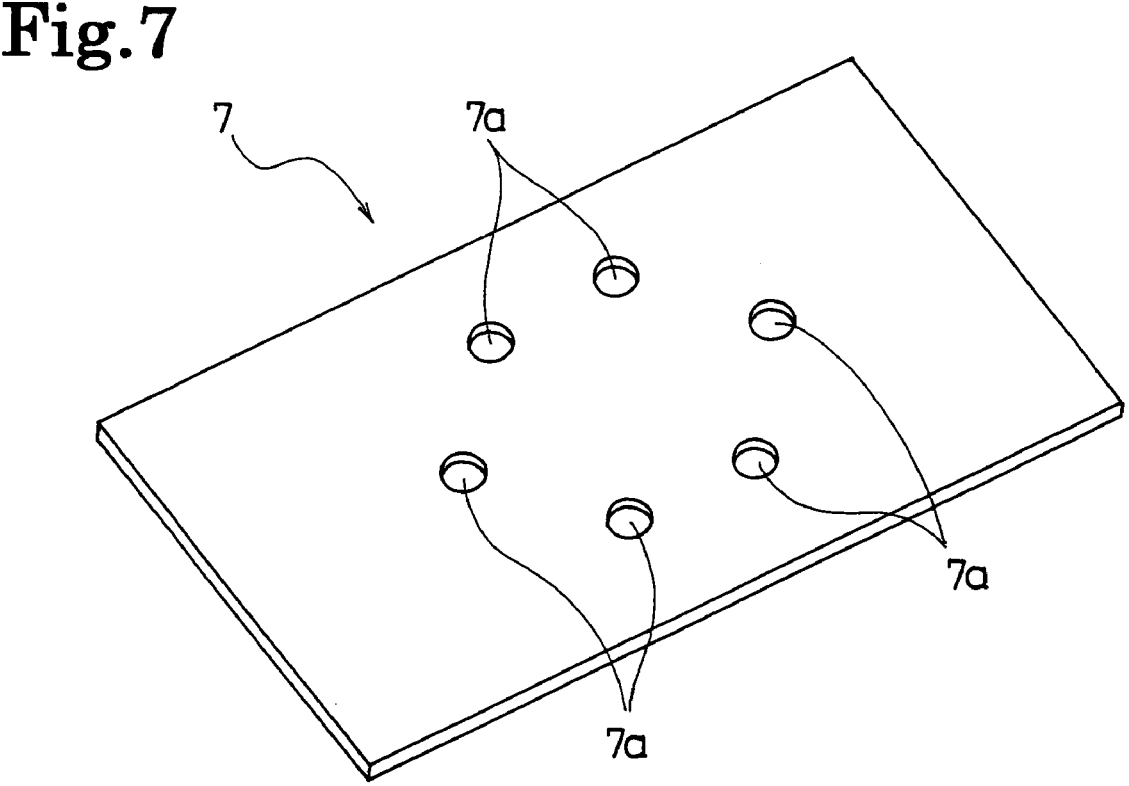
FIG. 7 is a perspective view showing a patch used in the present invention.
Figure 8:
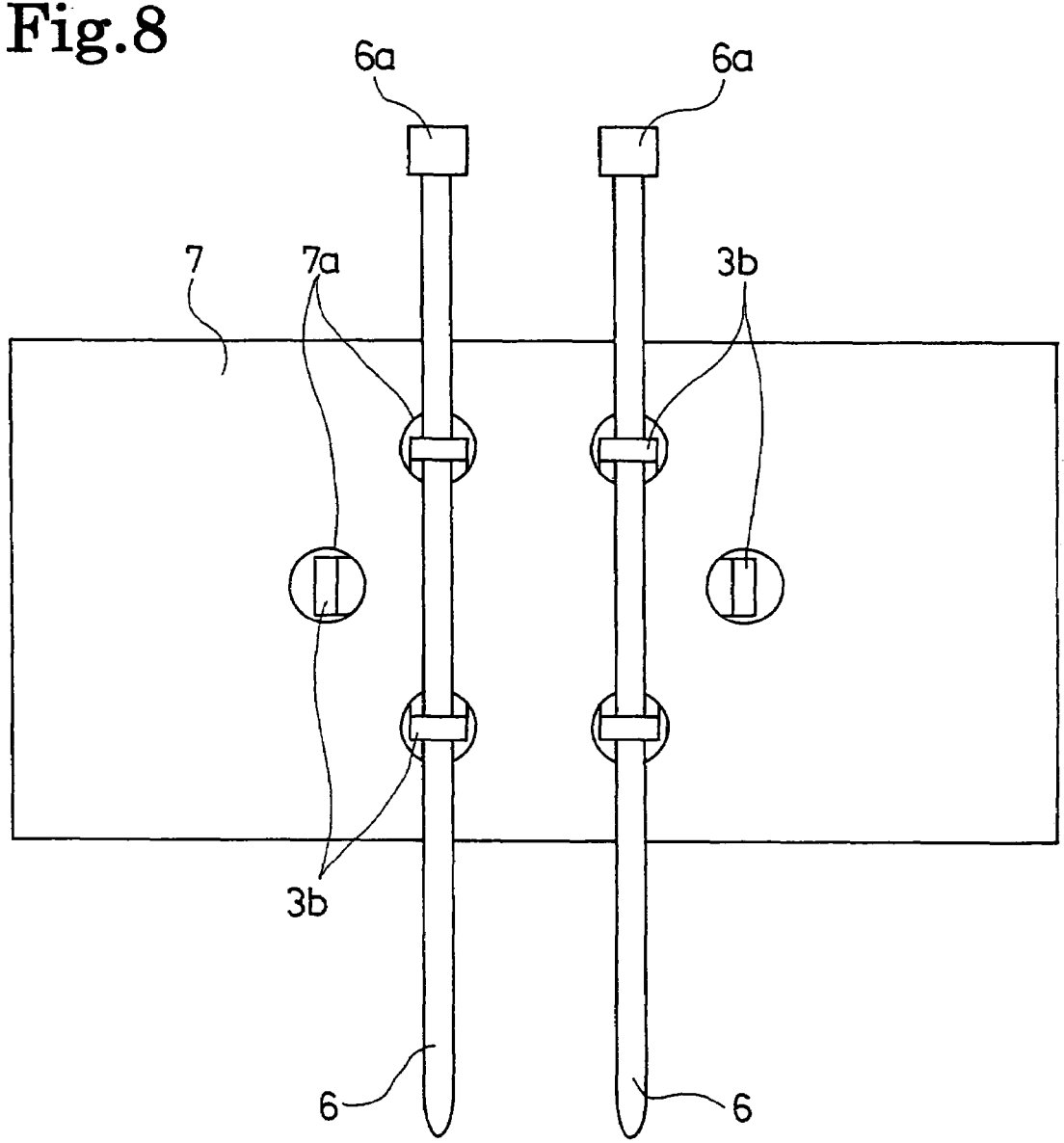
FIG. 8 is a plan view showing an assembly of the pedestal, the patch and binding bands, the assembly used in the present invention.

FIGS. 3 to 5 show an installation structure of an electronic component for a tire according to a preferred embodiment of the present invention. FIG. 6 shows a pedestal, FIG. 7 shows a patch, and FIG. 8 shows an assembly of the pedestal, the patch and binding bands.

As shown in FIGS. 3 to 5, the installation structure of an electronic component for a tire is a structure where an electronic component 2 housed in a case 1 is installed at an arbitrary installation position P in an air chamber of the tire.

Here, in installation of the electronic component 2, a pedestal 3, binding bands 6 and a patch 7 are used.

As shown in FIG. 6, the pedestal 3 is formed by integrally molding a base plate part 3a, which comes into contact with an installation position P, and a plurality of supporting parts 3b which support the case 1. The supporting parts 3b are bent from the base plate part 3a and have holes 3c for inserting the binding bands 6, the holes being formed in center portions in a height direction of the supporting parts 3b. Since heat produced by heat sources such as the tire and a braking device is easily transmitted to the pedestal 3 and the binding bands 6, the pedestal 3 and the binding bands 6 may be formed of resin of which continuous duty is allowed at temperatures of no less than 80° C., in consideration of a operating environment thereof.

The resin of which continuous duty is allowed at temperatures of no less than 80° C. is generally called engineering plastics. Specifically, nylon, 66 nylon, polyethylene [ultra high molecular weight polyethylene (UHMWPE)], polybenzimidazole (PBI), polytetrafluoroethylene (PTFE), polyphenylene sulfide (PPS), polyimide, polyacetal, polyether imide, polyimide amide, polyvinylidene fluoride, polyamide, polyetheretherketone (PEEK), polyethylene terephthalate (PET), acetal copolymer, polybutylene terephthalate (PBT), and the like can be cited. Particularly, 66 nylon is preferable.

As shown in FIG. 7, the patch 7 includes through holes 7a at positions corresponding to each one of the supporting parts 3b of the pedestal 3. As the patch 7, for example, one obtained by processing a commercially-available patch for repairing a tire can be used. A back side of the patch 7 has a surface that can be bonded to the installation position P.

The pedestal 3, the binding bands 6 and the patch 7, which are described above, are assembled as shown in FIG. 8, prior to installation of the electronic component 2. First, the supporting parts 3b of the pedestal 3 are inserted into the through holes 7a of the patch 7 to integrate the pedestal 3 and the patch 7. Next, the binding bands 6 are inserted into the holes 3c formed in the supporting parts 3b of the pedestal 3. Thereafter, the case 1 of the electronic component 2 is mounted on the supporting parts 3b of the pedestal 3 and the binding bands are wound around the case 1 and tied by use of binding parts 6a. Thus, the case 1 is fixed to the pedestal 3. In this event, a heat-insulating structure formed of a heat-insulating space 4 is formed between the case 1 and the base plate part 3a of the pedestal 3 (see FIGS. 3 to 5). Surplus portions of the binding bands 6 may be appropriately cut off. Moreover, a lining 8 may be laminated on a back side of the base plate part 3a, in order to avoid direct contact between the pedestal 3 and an inner surface of the tire or the like.

Thereafter, as shown in FIGS. 3 to 5, the back side of the patch 7 is bonded to the installation position P. Thus, the installation structure of an electronic component for a tire can be formed, where the base plate part 3a of the pedestal 3 is attached to the installation position P, the case 1 is fixed to the supporting parts 3b of the pedestal 3, and the heat-insulating structure formed of the heat-insulating space 4 is interposed between the case 1 and the base plate part 3a of the pedestal 3.

In the above-described installation structure of an electronic component for a tire, the heat-insulating structure is interposed between the electronic component 2, which is installed in the air chamber of the tire, and the installation position P. Thus, the electronic component 2 is protected from the heat produced by the tire and the braking device. At the same time, more accurate information about the inside of the tire can be obtained without being affected by the heat sources as described above. Consequently, an inexpensive component can be used as the electronic component 2, and life of the electronic component 2 can be extended. Moreover, while a temperature in the air chamber of the tire and an internal pressure of the tire are cited as the information about the inside of the tire, the accurate temperature can be obtained by preventing the electronic component from being affected by the heat sources as described above, and at the same time, it becomes possible to obtain a highly accurate cold air pressure calculated by an operation using the internal pressure of the tire, which is corrected based on the temperature.

Furthermore, in the embodiment described above, the case 1 of the electronic component 2 is fixed to the pedestal 3 by use of the binding bands 6. Thus, if there arises a problem with the electronic component 2, the electronic component 2 can be easily replaced by cutting off the binding bands 6.

However, means for fixing the case of the electronic component to the pedestal is not particularly limited. For example, engaging parts may be provided respectively on the pedestal and on the case, and the case may be fitted into the pedestal in a state where the engaging parts are engaged with each other. Moreover, when the case is fixed to the pedestal, a fastening structure by use of screws may be adopted.

The embodiment described above is suitable particularly for the case where the electronic component is installed on an inner surface of a pneumatic tire. When the electronic component housed in the case is installed on an outer peripheral surface of a rim of a wheel, a ring member capable of fastening, for example, is used instead of the patch. Accordingly, the pedestal may be attached to the outer peripheral surface of the rim by use of the ring member.

INDUSTRIAL APPLICABILITY

According to the present invention, in the structure where the electronic component housed in the case is installed at any installation position in the air chamber of the tire, the heat-insulating structure is interposed between the electronic component and the installation position. Thus, the electronic component is protected from the heat produced by the tire and the braking device. At the same time, more accurate information about the inside of the tire can be obtained without being affected by the heat sources. Moreover, if there arises a problem with the electronic component, the electronic component can be easily replaced by use of a detachable pedestal which supports the case of the electronic component.

Although the embodiment of the present invention has been described in detail above, it should be understood that various changes, alternatives, and substitutions can be made without departing from the spirit and scope of the present invention, which are defined by the attached claims.

What is claimed is:

1. An installation structure of an electronic component for a tire, comprising
   a case installed at an arbitrary installation position in an air chamber of the tire, the case housing the electronic component,
   a pedestal including a base plate part which comes into contact with the installation position, and supporting parts which support the case;
   the base plate part of the pedestal being attached to the installation position;
   the case being fixed to the supporting parts of the pedestal;
   a heat-insulating structure interposed between the case and the base plate part of the pedestal,
   a patch which can be bonded to the installation position integral with the pedestal,
   through holes in the patch at positions corresponding to the supporting parts of the pedestal, the pedestal being aligned by the catch while inserting the supporting parts into the through holes, and
   holes formed in at least some of the supporting parts of the pedestal for allowing binding bands to be inserted into the holes and wound around the case.

2. The installation structure of an electronic component for a tire according to any of claim 1, wherein a heat-insulating space is interposed as the heat-insulating structure.

3. The installation structure of an electronic component for a tire according to any of claim 1, wherein a heat-insulating material is interposed as the heat-insulating structure.

4. The installation structure of an electronic component for a tire according to claim 3, wherein the heat-insulating material is formed of any of resin foam, organic fibers and inorganic fibers.

5. The installation structure of an electronic component for a tire according to claim 1, wherein the pedestal is formed of resin of which continuous duty is allowed at temperatures of no less than 80° C.

* * * * *